| Relay R1 | Relay R2 | Relay R3 |
|---|---|---|
| (1) P | D | D (Static) |
| (2) P→D | P | D |
| (3) D | P | D→P |
| (4) D | P→D | P |
| (5) D→P | D | P |
| (6) P | D | P→D |
| (1) P | D→P | D (Dynamic) |

INVENTOR:
Roman E. Lukianov,
BY Bair, Freeman & Molinare
ATTORNEYS.

United States Patent Office 3,059,154
Patented Oct. 16, 1962

3,059,154

DATA PROCESSING APPARATUS

Roman E. Lukianov, Newtonville, Mass., assignor to Minneapolis-Honeywell Regulator Company, Minneapolis, Minn., a corporation of Delaware Filed Feb. 17, 1959, Ser. No. 793,887
1 Claim. (Cl. 317—139)

Figures 1, 2:
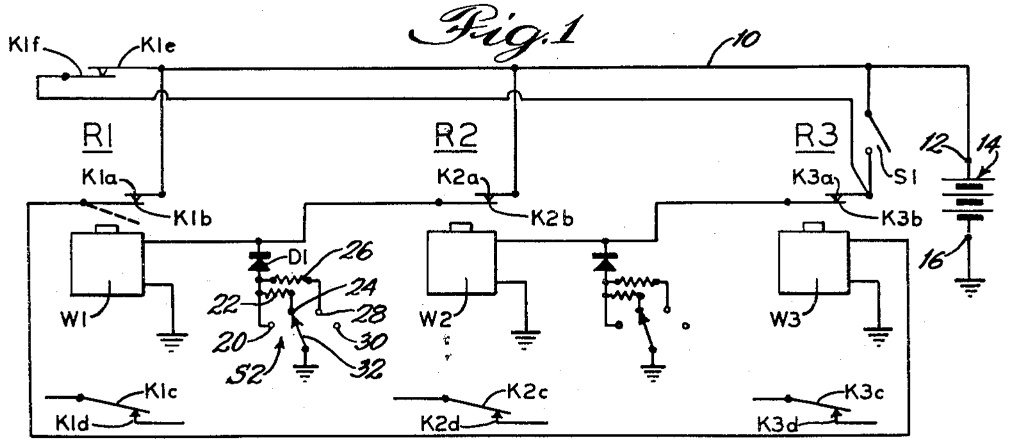

This invention relates generally to improvements in electrical oscillators and more particularly to a multiphase oscillator of the relay type.

In the electrical arts, and particularly in the field of electrical control, there frequently arises a need for a selectively variable oscillator circuit. It is known to utilize vacuum tubes, transistors, and the like to provide a variable frequency oscillator function, but many problems arise in the use of such devices since factors such as heat, voltage variation, etc., often adversely affect the reliability of such oscillators. As a result, where reliability is important, the cost and complexity of suitable electronic devices have been increased substantially by the need of compensating circuits and components.

Electrical oscillators of the relay type are known wherein the relays are connected to operate in a closed ring fashion. Relay type oscillators generally operate at a fixed frequency and it has been found extremely difficult to provide selective frequency variation for such relay oscillators without going into considerably complex circuitry.

Accordingly, it is a general object of this invention to provide a new and improved relay oscillator of the variable frequency type. More particularly, it is an object of this invention to provide such a relay oscillator in which the time pulse width of relay operations may be varied in a selective manner to thereby enable selective variation of the oscillator frequency.

It is a further object of this invention to provide such a relay oscillator which is relatively inexpensive to construct and operate.

It is another object of this invention to provide a new and improved relay oscillator of considerable flexibility in that it may be constructed with any suitable number of stages.

It is still another object of this invention to provide an improved relay oscillator, as described above, which is characterized by its stability of operation and its simplicity of construction.

In accordance with the features of a specific illustrative embodiment of the invention, a plurality of relays have their windings and contacts interconnected in a unique fashion with a source of power such that the relays, when not energized, always return to a fixed stable state condition, and, when energized, continue to oscillate at a frequency which may be selectively varied as desired by selectively varying the pulse width of the relay operations. Thus, in the illustrative example described in greater detail below, the relay oscillator circuit comprises three relays each having at least one relay winding and at least one pair of normally closed contacts adapted to be actuated by the energization of their associated relay winding. The winding of each relay is connected in a series circuit with a source of power through the pair of contacts of the succeeding relay in the oscillation cycle.

When the oscillator is at rest, one relay winding is energized and the remaining relay windings are not energized—that is the normal fixed stable state condition of the oscillator. The turning on of the oscillator causes the next succeeding relay following the energized relay to have its winding energized, and the opening of the contacts of the newly energized relay opens the power circuit of the previously energized relay. After a period of time dependent upon the transition period of the previously energized relay, the contacts of this latter relay close, and the circuit continues to step around in a cyclic manner until the oscillator is turned off.

In accordance with a further feature of this invention, the inductive delay in the collapse of the relay magnetic field, when the relay winding is de-energized, serves to keep the relay picked-up for a period of time determined by the time constant of the relay winding circuit. As long as the de-energized relay remains picked-up or energized after its power circuit has been broken, its contacts will remain open. At the end of the transition period during which the relay field is collapsing, the relay contacts close to permit the oscillation cycle to step around the relay circuit.

It is a feature of this invention to provide an adjustable time constant for the inductive circuit of one or more of the relay windings to the end that the time pulse width of relay operation may be varied in any suitable manner. As the time constant of a given relay is selectively varied, the transition period for this relay will vary accordingly, and thus the frequency of oscillation of the circuit will be varied.

The above and other features of novelty which characterize the invention are pointed out with particularity in the claim appended to and forming a part of this specification. For a better understanding of the invention, its advantages and the specific objects attained by its use, reference is had to the accompanying drawing and descriptive material in which is shown and described an illustrative embodiment of the invention.

In the drawing:

FIGURE 1 is a schematic representation of an illustrative variable frequency relay oscillator embodying the invention; and FIGURE 2 is a chart illustrating a cycle of operation of the oscillator shown in FIGURE 1.

Referring now to the drawing, and more particularly to FIGURE 1 thereof, there is shown a specific illustrative embodiment of a relay oscillator in accordance with the invention. Although the invention is illustrated as comprising a relay circuit having three relay stages, it will be understood by those skilled in the art that the principles of the invention are equally applicable to relay oscillators having any suitable number of relay stages.

As shown in FIGURE 1, the illustrative relay oscillator comprises a relay R1 having at least one relay winding W1 and at least three pairs of associated contacts K1*a* and K1*b*, K1*c* and K1*d*, and K1*e* and K1*f*; a relay R2 having at least one relay winding W2 and at least two pairs of associated relay contacts K2*a* and K2*b*, and K2*c* and K2*d*; and a relay R3 having at least one relay winding W3 and at least two pairs of associated contacts K3*a* and K3*b*, and K3*c* and K3*d*.

In accordance with this embodiment of the invention, the relay contact groups K1, K2 and K3 are normally closed, i.e., each pair of relay contacts is closed when its associated relay winding is not energized, and upon energization of its associated relay winding, the contacts are caused to open.

Those skilled in the art will readily appreciate that the opening and closing of each pair of relay contacts is characterized by a transition period, that is, a time delay between the energization and de-energization of its associated relay windings, and the respective opening and closing of the contacts. This transition period of contact operation is dependent upon the time requirements for the magnetic field to build up in the relay winding when it is energized, and for the magnetic field to die out when the relay winding is de-energized. It will be readily understood by those skilled in the art, that upon de-energization of a relay winding, for example, the magnetic field of the winding cannot collapse immediately, but rather, it will collapse at a rate dependent upon the time constant which may be expressed as $$t=\frac{L}{R}$$

In the instant invention, this delay in the collapse of the relay winding field maintains the relay in its picked-up state—that is, it keeps the relay contacts open—until the magnetic field collapses sufficiently to release the contacts to permit them to close. It is a feature of this invention, that the time pulse width of relay operations and therefore, the frequency of oscillation of the circuit may be varied in a selective manner by varying the length of this transition period in one or more of the relays of the oscillator circuit.

As shown in FIGURE 1 of the drawing, the relay windings and certain ones of their associated contacts are connected in a particular manner to provide a fixed stable state condition to which the oscillator always returns when it is at rest. One contact of each pair of contacts—namely, contact K1*a* of relay R1, contact K2*a* of relay R2, and contact K3*a* of relay R3—is connected through a common power line 10 to a source of potential, such as the positive terminal 12 of battery 14. Advantageously, the negative terminal 16 of battery 14 is connected to ground.

Contact K1*b* of relay R1 is connected to a terminal of relay winding W3, the other terminal of which is connected to ground. Contact K2*b* of relay R2 is connected to a terminal of relay winding W1, the other terminal of which is connected to ground. Similarly, contact K3*b* of relay R3 is connected to a terminal of relay winding W2, the other terminal of which is connected to ground.

Advantageously, an On-Off switch S1 is connected between contact K3*a* of relay R3 and the common power line 10 and the contacts K1*f* and K1*e* of relay R1 are connected in parallel with the switch S1. For purposes of illustration a contact K2*b* of relay R2 is shown as connected to a terminal of diode D1, the other terminal of which is connected to the frequency adjusting switch S2. The diode D1 is connected directly to fixed contact 20 of frequency switch S2; through a resistance element 22 to fixed contact 24 of switch S2; and through a resistance element 26 to fixed contact 28 of the switch S2. A further contact 30 of switch S2 is provided, but as shown in the drawing, this contact is not connected to the diode D1. The movable switch contact 32 of switch S2 is connected to ground and may selectively be connected to any one of the fixed switch contacts 22, 24, 28 or 30, as desired. Those skilled in the art will readily appreciate as the description progresses that a similar diode D1 and frequency adjusting switch S2 may be associated with any one or more of the relay windings, as desired, to provide a very flexible circuit to control phasing of the relay output pulses which in turn, controls the frequency of the oscillator. Manifestly, with such additional delay networks—in a preferred embodiment, a delay network was connected to each relay winding—the relay stages may be adjusted individually or by means of a common switch knob.

The cyclic operation of the illustrative relay oscillator of FIGURE 1 is illustrated in the chart of FIGURE 2. This chart indicates by the symbol P that the relay winding is picked-up or in its energized state, and by the symbol D that the winding is dropped-out or in its de-energized state. When the relay oscillator circuit is at rest, that is, when the On-Off switch S1 is opened, it can be seen that the relay winding W1 will be energized through the normally closed contacts K2 of relay R2. The energization of relay winding W1 causes its group of contacts K1 to be opened, and as the power circuits to the relays R2 and R3 are opened, these relays remain unenergized. This condition is illustrated in line 1 of FIGURE 2 chart wherein relay R1 is shown as picked-up and relays R2 and R3 are shown as dropped out. This is the fixed stable state condition of the relay oscillator and exists whenever the switch S1 is opened.

Closure of the switch S1 completes a power circuit for relay winding W2 causing its normally closed contacts K2 to open and break the power circuit through relay winding W1. This is illustrated in line 2 of the FIGURE 2 chart which shows relay winding W2 as picked-up, relay winding W3 as dropped-out and relay winding W1 as going from its picked-up condition to its dropped-out condition. As explained heretofore, the magnetic field of relay winding W1 cannot collapse immediately, but rather it collapses at a rate determined by the time constant of the circuit. This delayed collapse of the relay magnetic field serves to keep the relay picked-up during the transition period. This transition period is illustrated in Chart 2 by the symbol P→D to show that the relay winding is going from its picked-up to its dropped-out condition over a definite time period.

The magnetic field of relay winding W1 finally collapses and the drop-out of this relay causes its contacts K1*a* and K1*b* to close thereby completing the power circuit to relay winding W3, and in addition causes work contacts K1*c* and K1*d*, and contacts K1*e* and K1*f* to close. This condition is illustrated in line 3 of FIGURE 2 which shows relay R1 as dropped-out, relay R2 as still picked-up since its power circuit has not been broken, and relay winding W3 as going from its dropped-out to picked-up state. It now can be appreciated that during this transition period before the relay winding W3 is fully energized, its contacts K3*a* and K3*b* remain closed to keep relay R2 picked-up. At the end of this transition period, relay winding W3 becomes fully energized to open its contacts K3, thereby breaking the power circuit to relay winding W2. At this time, the relay winding W2 magnetic field is in its transition period and its contacts K2*a* and K2*b*, and work contacts K2*c* and K2*d* remain open. This is shown in line 4 of FIGURE 2 wherein relay R1 is shown as dropped-out, relay R2 as going from its picked-up to its dropped-out condition, and relay R3 is shown as picked-up.

As soon as relay R2 drops out, its contacts K2*a* and K2*b* return to their normally closed condition to complete the power circuit to relay winding W1, while at the same time the work contacts K2*c* and K2*d* return to their normally closed condition. This is shown in line 5 of Chart 2 which indicates relay R1 as in a transition state going from its dropped-out to its picked-up condition, relay R2 as dropped out, and relay R3 as still picked-up since the contacts K1*a* and K1*b* of relay R1 remain closed at this time.

At the end of the transition period of relay R1, its winding W1 is picked-up to open its contacts K1, thereby breaking the power circuit to relay winding W3. This is shown in line 6 of Chart 2 which indicates the relay R1 as picked-up, relay R2 as dropped-out, and relay R3 as going from its picked-up to its dropped-out condition while the magnetic field of its winding W3 collapses.

The relay oscillator has now gone through one cycle of the operation and as long as the switch S1 remains closed, it will continue to oscillate and repeat the cycle of operation described in detail above, with the exception that the first step of each remaining cycle will be as shown in the new line 1 following line 6 as these steps begin with the circuit in its dynamic rather than static state.

Those skilled in the art will now appreciate that the period of transition of the relay windings determines the time pulse width of relay operations and therefore the frequency of oscillation of the relay circuit. Thus, in accordance with an aspect of this invention, means are provided to vary selectively the transition period of any one or more of the relay windings by varying the relay time constants to thereby vary the frequency of oscillation of the circuit. These means comprise the diode D1, the resistance elements 22 and 26, and the contacts of the switch S2 connected to each relay winding. Preferably, resistance element 22 is smaller than resistance element 26. Thus, it can be seen that as the movable contact 32 of switch S2 is scanned over the fixed contacts 20, 24, and 28, respectively, the time constant $$\left(t=\frac{L}{R}\right)$$

for the relay winding W1 is decreased in steps as the switch places in circuit the direct connection to ground, the added resistance of resistance element 22, and then to the still greater added resistance of resistance element 26. When the movable contact 32 of switch S2 is placed on contact 30, the time constant for relay winding W1 will be at its smallest value, and the transition period for the relay winding will have its shortest length. Thus, when contact 32 of switch S2 is placed on contact 20 the transition period of relay winding W1 is at its highest value, the time delay for relay operation will be at a maximum, and the relay oscillator will oscillate at its lowest frequency. As the switch contact 32 is placed on contact 24, the transition period is shortened and the relay oscillator will oscillate at a higher frequency. Still further, as the contact 32 of switch S1 is moved to contacts 28 and 30, the relay frequency is still further increased due to the decrease of the winding circuit time constant. Manifestly, any number of switch contacts may be provided to the end that any desired number of oscillator frequencies may be attained.

Those skilled in the art will also appreciate that in lieu of the step by step frequency control provided by switch S1, a continuously variable control with a substantially higher number of available frequencies may be provided by use of a suitable sliding potentiometer control connected to the diode D1.

It further should be noted that the multi-phase relay oscillator shown in FIGURE 1, due to the effect of the contacts K1*e* and K1*f* connected in parallel with the On-Off switch S1, always returns to its fixed stable state condition, namely, that illustrated at line 1 of FIGURE 2. Thus, when the On-Off switch S1 is opened, regardless of the operating condition of the circuit at that time, the circuit will continue to oscillate through its cycle of operation until the stable state condition is reached with relay R1 picked-up and relays R2 and R3 dropped-out. This feature insures that the relay oscillator will always start from the same predetermined stable state. Those skilled in the art will readily appreciate that if relay oscillators having a greater number of relays are constructed in accordance with the invention, then additional resetting switches, such as the contacts K1*e* and K1*f*, will be required with the On-Off switch S1 and that the number of such resetting switches will be determined by the number of relays comprising the oscillator.

Conveniently, the work contacts K1*c* and K1*d* of relay R1, K2*c* and K2*d* of relay R2, and K3*c* and K3*d* of relay R3 are connected to suitable output circuitry which is adapted to be operated at the pulse rate of the oscillator relays. As pointed out heretofore, such output circuitry may include, but is not limited to, data processing circuits, telemetering devices, computers, and the like.

I have shown and described a multi-phase relay oscillator having means for selectively varying the time pulse width of relay operations and thereby varying the frequency of oscillation, as desired. Not only is the invention relatively simple and inexpensive to construct, it nevertheless is chartcerized by its flexibility and by its reliability of operation. It will be understood by those skilled in the art that modifications may be made in the construction and arrangement of the parts of the above-described multi-phase relay oscillator without departing from the real spirit and purpose of the invention, and that it is intended to cover by the appended claims all such changes and modifications as fall within the true spirit and scope of the invention.

What is claimed as the invention is:

In combination, a plurality of relay stages having a single pre-arranged stable state condition wherein one relay stage is energized and the remaining relay stages are not energized, each relay stage comprising a relay winding and a pair of normally closed contacts operatively associated with said relay winding and in series with the relay winding of the next preceding relay in the oscillator cycle of operation, a source of power, means interconnecting the relay windings and the pairs of normally closed contacts in an operating circuit with said source of power, switch means connected in series circuit with one relay winding and the pair of normally closed contacts associated with the next succeeding relay winding in the oscillator cycle of operation, the closing of said switch means serving to place said plurality of relay stages into oscillation with each relay winding becoming energized in turn by the closing of the contacts of the previously energized relay winding in response to the de-energization of the latter, and the opening of said switch means serving to terminate said oscillation after the relay stages have returned to said pre-arranged stable state condition with one relay stage energized and the remaining relay stages de-energized, and selectively adjustable means for varying the time pulse width of relay operation by varying the time length of the transition period of operation of at least one relay winding and its associated pair of contacts.

References Cited in the file of this patent

UNITED STATES PATENTS

| | | |
|---|---|---|
| 1,516,646 | Roseby | Nov. 15, 1924 |
| 1,742,367 | Nettleton | Jan. 7, 1930 |
| 2,001,494 | Jones | May 14, 1935 |
| 2,080,273 | Holmes | May 11, 1937 |
| 2,347,481 | Hooven | Apr. 25, 1944 |
| 2,685,052 | Boyer | July 27, 1954 |
| 2,789,256 | Stenerson | Apr. 16, 1957 |
| 2,892,105 | Speer | June 23, 1959 |

FOREIGN PATENTS

| | | |
|---|---|---|
| 612,774 | Great Britain | Nov. 17, 1948 |